United States Patent
Elahi et al.

(10) Patent No.: US 8,300,561 B2
(45) Date of Patent: Oct. 30, 2012

(54) METHODS AND APPARATUS FOR CANCELING DISTORTION IN FULL-DUPLEX TRANSCEIVERS

(75) Inventors: Imtinan Elahi, Richardson, TX (US); Khurram Muhammad, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 975 days.

(21) Appl. No.: 12/346,591

(22) Filed: Dec. 30, 2008

(65) Prior Publication Data

US 2010/0165895 A1    Jul. 1, 2010

(51) Int. Cl.
*H04B 3/30* (2006.01)
*H04B 1/00* (2006.01)

(52) U.S. Cl. .................. 370/278; 370/290; 455/63.1
(58) Field of Classification Search .................. None
See application file for complete search history.

(56) References Cited

U.S. PATENT DOCUMENTS

| | | | | |
|---|---|---|---|---|
| 5,953,380 | A * | 9/1999 | Ikeda | 375/346 |
| 6,636,604 | B1 * | 10/2003 | Taege | 379/406.01 |
| 7,003,095 | B2 * | 2/2006 | Nakai et al. | 379/406.01 |
| 2002/0176589 | A1 * | 11/2002 | Buck et al. | 381/94.7 |
| 2007/0184782 | A1 * | 8/2007 | Sahota et al. | 455/63.1 |
| 2008/0242245 | A1 | 10/2008 | Aparin | |
| 2009/0060167 | A1 * | 3/2009 | Deng et al. | 379/406.08 |
| 2010/0150033 | A1 * | 6/2010 | Zinser et al. | 370/278 |

OTHER PUBLICATIONS

Ali-Ahmad, Walid, "Effective IM2 estimation for two-tone and WCDMA modulated blockers in zero-IF," www.rfdesign.com, Apr. 2004, 5 pages.
S. Haykin, "Adaptive Filter Theory," Prentice Hall Information and System Sciences Series, Fourth Edition, 2001, pp. 367-438.
S. Haykin, "Adaptive Filter Theory," Prentice Hall Information and System Sciences Series, Fourth Edition, 2001, pp. 446-478.
S. Haykin, "Adaptive Filter Theory," Prentice Hall Information and System Sciences Series, Fourth Edition, 2001, pp. 566-694.
B. Widrow et al., "Adaptive Signal Processing," Englewood Cliffs, NJ: Prentice-Hall, 1985, cover sheet, table of contents, pp. 99-116 and pp. 141-192.
A.H. Sayed, "Fundamentals of Adaptive Filtering," Wiley-IEEE, 2003, pp. 174-178.
A.H. Sayed, "Fundamentals of Adaptive Filtering," Wiley-IEEE, 2003, pp. 214-248.

* cited by examiner

*Primary Examiner* — Chi Pham
*Assistant Examiner* — Soon-Dong D Hyun
(74) *Attorney, Agent, or Firm* — John R. Pessetto; W. James Brady; Frederick J. Telecky, Jr.

(57) ABSTRACT

Methods and apparatus for canceling distortion in full-duplex transceivers are disclosed. Some example methods to reduce distortion in a full-duplex transceiver include generating a first digital signal, generating a first analog signal based on the first digital signal for transmission over a full-duplex channel, receiving a second analog signal via the full-duplex channel, and generating a second digital signal based on the second analog signal, wherein the second digital signal includes coupling distortion based on the first analog signal. The example methods further include generating an adaptive filter signal based on the first digital signal, and reducing the coupling distortion from the second digital signal by subtracting the adaptive filter signal from the second digital signal.

18 Claims, 6 Drawing Sheets

METHODS AND APPARATUS FOR CANCELING DISTORTION IN FULL-DUPLEX TRANSCEIVERS

FIELD OF THE DISCLOSURE

This disclosure relates generally to full-duplex communication and, particularly, to methods and apparatus for cancelling distortion in full-duplex transceivers.

BACKGROUND

In full-duplex communication, both transmit and receive channels may operate simultaneously. However, known duplexer circuits that isolate a transmit channel from a receive channel allow some transmitter signal leakage into the receiver channel. The transmitter signal may also leak to the receiver via other on-chip or off-chip coupling paths. Transmitter signal leakage into the receiver may make received signals hard to detect in a signal processor, resulting in data errors and/or overall reduction in throughput.

SUMMARY

Example methods and apparatus for canceling distortion in full-duplex transceivers are described below. Some example methods to reduce distortion in a full-duplex transceiver include generating a first digital signal, generating a first analog signal based on the first digital signal for transmission over a full-duplex channel, receiving a second analog signal via the full-duplex channel, and generating a second digital signal based on the second analog signal, wherein the second digital signal includes coupling distortion based on the first analog signal. The example methods further include generating an adaptive filter signal based on the first digital signal, and reducing the coupling distortion from the second digital signal by subtracting the adaptive filter signal from the second digital signal.

DETAILED DESCRIPTION

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Although the following discloses example methods and apparatus, it should be noted that such methods and apparatus are merely illustrative and should not be considered as limiting. The example circuits described herein may be implemented using discrete components, integrated circuits (ICs), or any combination thereof. Accordingly, while the following describes example methods and apparatus, persons of ordinary skill in the art will readily appreciate that the examples are not the only way to implement such methods and apparatus.

The example methods and apparatus described herein may be used to reduce or eliminate distortion caused by transmitter leakage in a full-duplex transceiver system. Such full-duplex transceivers may be implemented in, for example, third-generation ("3G") wireless applications. In some examples, a digital baseband processor generates a digital baseband signal for transmission via a full-duplex transceiver. The digital baseband signal is transmitted as an analog signal via the full-duplex transceiver. The transmission of the analog signal results in transmitter leakage to the receiver portion of the full-duplex transceiver. The example methods and apparatus determine first or second-order terms from the generated digital baseband signal, and apply an adaptive digital filter based on the first or second-order terms to reduce or eliminate noise introduced by transmitted signals into received signals. Alternatively, some example methods generate an adaptive filter term based on the generated digital baseband signal, and determine a first or second-order term of the adaptive filter term to reduce or eliminate the noise.

Figure 1:
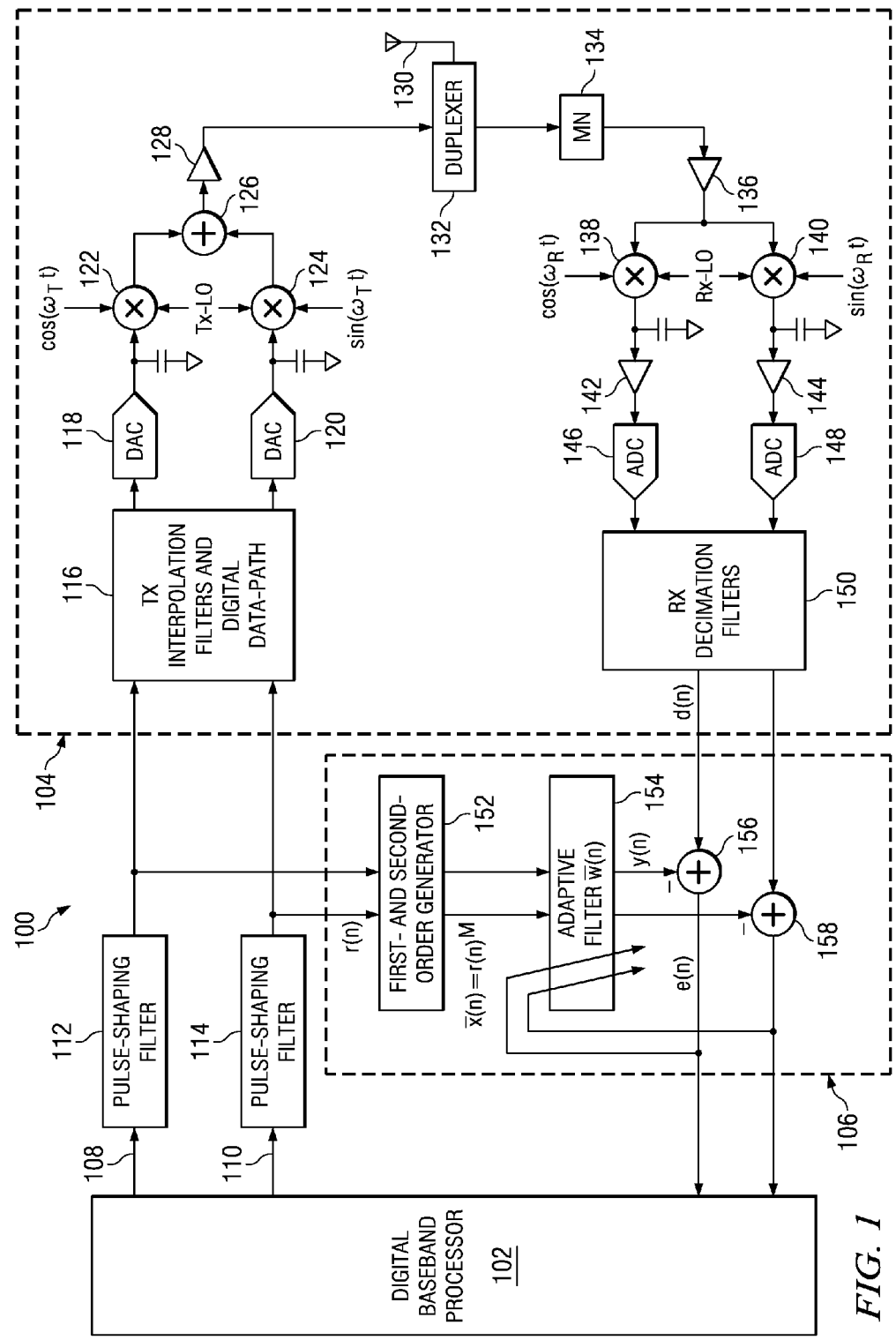
FIG. 1 is a block diagram illustrating an example full-duplex receiver configured to cancel distortion in a received signal from transmitter leakage.

FIG. 1 is a block diagram illustrating an example full-duplex communication system 100 configured to cancel distortion in a received signal from transmitter leakage. The system 100 includes a digital baseband processor 102, a transceiver 104, and an adaptive filter 106. The example digital baseband processor 102 processes digital data for transmission and received digital data at the baseband frequency of the processor 102. The example transceiver 104 is configured for full-duplex communication (i.e., for simultaneous transmission and reception of signals over one transmission medium). The transceiver 104 converts and transmits digital signals received from the processor 102 and sends digital data received from an external source to the processor 102. The adaptive filter 106 uses the clean digital signals generated by the digital baseband processor 102 for transmission, simulates the filtering of the transceiver 104, and subtracts the filtered signals from received digital data signals.

The digital baseband processor 102 generates digital signals for transmission based on, for example, data applications run on the processor 102 that send or receive information. The digital signals are generated in in-phase 108 and quadrature 110 (i.e., 90 degree phase-shift) and, thus, represent complex digital signals. Pulse-shaping filters (PSFs) 112 and 114 pulse shape the complex digital signals generated by the digital baseband processor 102 to prevent inter-symbol interference. In some examples, the PSFs 112 and 114 may be implemented using a root-raised cosine (RRC) filter.

The transceiver 104 receives the digital signals r(n) prepared by the PSFs 112 and 114, and an interpolation filter 116 further prepares the signals r(n) for transmission. For example, the interpolation filter 116 increases the rate of the respective digital signal to a desired level by adding additional signals between digital signals received from the radio resource controllers 112 and 114. The interpolation filter 116 may receive a first digital signal and a second digital signal, and generate a third digital signal temporally between the first and second digital signals based on the values of the first and second digital signals. The interpolation filter 116 effectively increases the temporal resolution of the digital data signals before sending the signals to digital-to-analog converters (DACs) 118 and 120. The DACs generate analog (i.e., continuous time) signals based on the discrete digital signals received from the interpolation filter 116.

The analog signals generated by the DACs 118 and 120 are then mixed with transmitter local oscillator (Tx-LO) signals using frequency mixers 122 and 124. The in-phase signal is mixed with $\cos(\omega_T t)$ at a radian frequency of $\omega_T$. The quadrature signal is mixed with $\sin(\omega_T t)$ at the radian frequency $\omega_T$. The mixed signals are then combined at a summer 126, amplified at a power amplifier 128, and multiplexed to an antenna 130 for transmission via a duplexer 132.

While the antenna 130 is transmitting signals based on data generated by the processor 102, the antenna 130 also receives signals from external sources. Received signals are modulated at a different frequency than the transmitted signals, so the duplexer 132 differentiates the transmitted signals from the received signals and forwards the received signals to a matching network (MN) 134. The MN 134 matches the impedance of the incoming signal to, for example, prevent signal reflections that may cause interference.

A low-noise amplifier (LNA) 136 amplifies the received signal with minimal distortion, and passes the amplified signals to mixers 138 and 140. A receiving local oscillator (Rx-LO) generates mixing signals at a frequency $\omega_R$ to generate in-phase and quadrature analog signals at the mixers 138 and 140.

Figure 3:
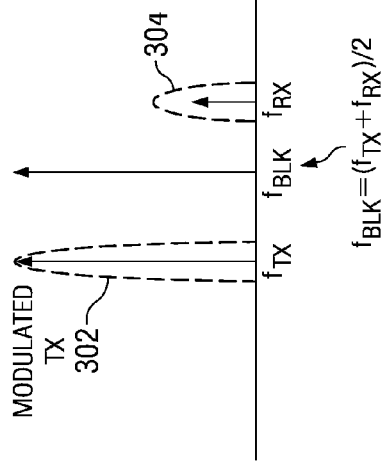
FIGS. 3 and 4 illustrate input and output signals of a receiver low-noise amplifier in response to third-order intermodulation distortion from transmitter leakage in a full-duplex transceiver.
Figure 3:
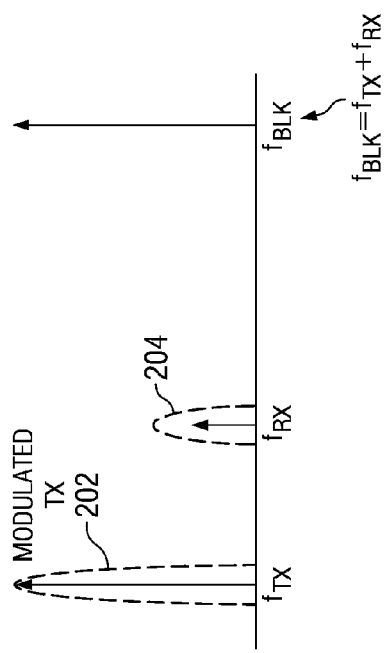
Figure 2:
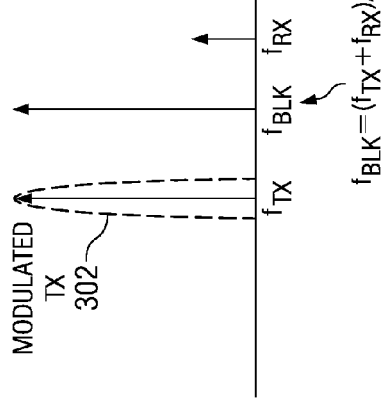
FIG. 2 illustrates input and output signals of a receiver low-noise amplifier in response to second-order intermodulation distortion from transmitter leakage in a full-duplex transceiver.
Figure 2:
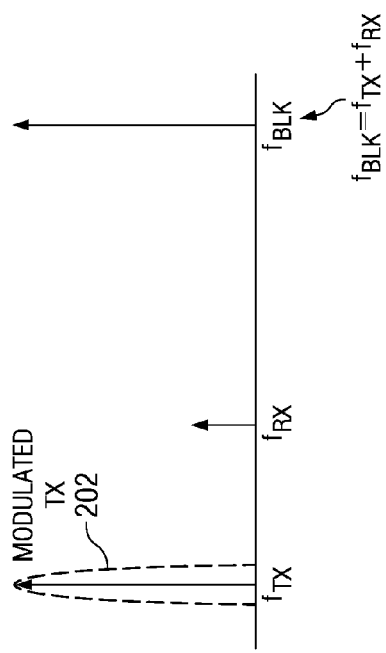
Figure 4:
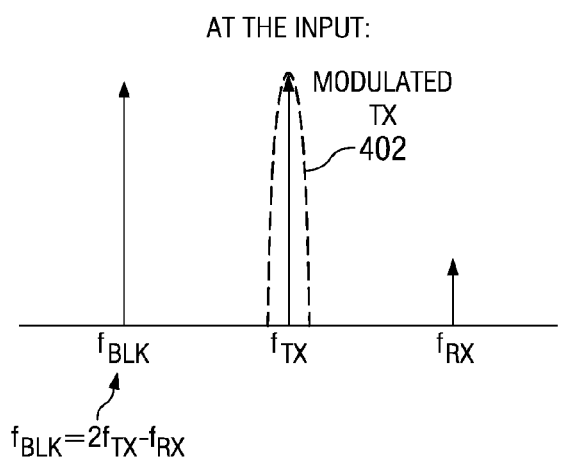
Figure 4:
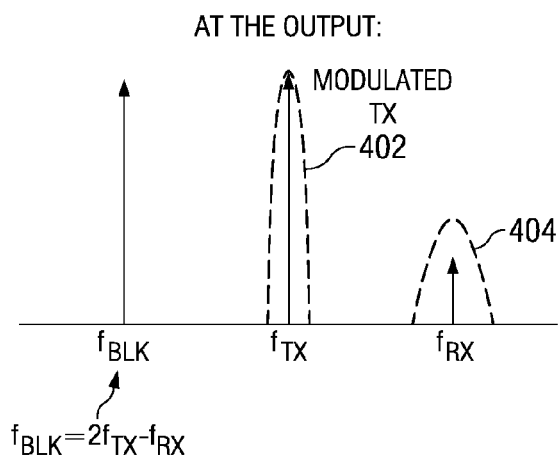

In addition to receiving signals at desired receiving frequencies, the antenna 130 may also receive signals and/or noise at undesired frequencies. Signals at certain frequencies may cause intermodulation distortion when mixed with the transmitter leakage frequencies. Such signals are called continuous wave blocker signals if the signals are single frequency sine wave signals. Modulated interferers, which have a bandwidth greater than zero, may also cause intermodulation distortion. Additionally, the transmit channel typically causes signal leakage into the receive channel via the duplexer 132. The transmitter leakage may occur via the example duplexer 132 and/or through any other coupling path between the transmit channel and the receive channel. For example, the Tx-LO may leak to the Rx-LO, causing transmitter leakage at the mixer input to be down-converted to base-band, which can create an undesired distortion in the received signal. When processing signals that include the transmitter leakage and blocker signals, the LNA 136 and the mixers 138 and 140 generate spurious signals and intermodulation distortion. As shown in FIGS. 2-4, the frequency of the blocker signal relative to the transmitter and receiver frequencies determines the type of transmitter leakage that causes interference.

The outputs of the frequency mixers 138 and 140 are amplified by variable gain amplifiers (VGAs) 142 and 144, respectively. The VGAs 142 and 144 adjust the respective gains based on the input amplitudes to output signals with substantially constant amplitudes. The outputs of the VGAs 142 and 144 are sent to analog-to-digital converters (ADCs) 146 and 148, respectively, which convert the received and amplified analog signals to digital representations of the signals. One or more receiver decimation filters 150 receive the digital signals from the ADCs 146 and 148 and reduce the number of digital samples used to represent those signals. Decimation filters are well-known and therefore will not be discussed further. The interpolation filters 116 and the decimation filters 150 may be configured such that the transmitted digital signals r(n) and the received digital signals d(n) have an equal or substantially equal sampling rate.

FIG. 2 illustrates the frequencies and powers for input and output signals of a receiver LNA in response to second-order intermodulation distortion from transmitter leakage in a full-duplex transceiver. In the example of FIG. 2, the full-duplex transmission signal has a finite bandwidth 202 and a center frequency of $f_{TX}$. The receiving frequency is $f_{RX}$, and there is a blocking signal at frequency $f_{BLK}=(f_{TX}+f_{RX})$.

The second-order intermodulation products of $f_{TX}$ and $f_{BLK}$ include $f_{BLK}-f_{TX}$. As a result, there is a second-order intermodulation product 204 at $f_{RX}$, having a bandwidth substantially equal to the bandwidth 202 of the transmission signal. Thus, the second-order intermodulation product frequency folds onto the $f_{RX}$ frequency and causes interference. The receiver has difficulty distinguishing the received signal from the spurious signal interference.

FIG. 3 illustrates the frequencies and powers for input and output signals of a receiver LNA in response to third-order intermodulation distortion from transmitter leakage in a full-duplex transceiver. In the example of FIG. 3, the full-duplex transmission signal has a bandwidth 302 and a center frequency of $f_{TX}$. The receiving frequency is $f_{RX}$, and there is a blocking signal at frequency $f_{BLK}=(f_{TX}+f_{RX})/2$.

The third-order intermodulation products of frequencies $f_{TX}$ and $f_{BLK}$ include $2*f_{BLK}-f_{TX}$, which results in a spurious signal 304 at the frequency $f_{RX}$, having a bandwidth equal to the bandwidth 302 of the transmission signal. Thus, the third-order intermodulation product frequency folds onto the $f_{RX}$ frequency and causes interference. The receiver has difficulty distinguishing the received signal from the spurious signal interference.

FIG. 4 illustrates the frequencies and powers for input and output signals of a receiver LNA in response to third-order intermodulation distortion from transmitter leakage in a full-duplex transceiver. In the example of FIG. 4, the full-duplex transmission signal has a bandwidth 402 and a center frequency of $f_{TX}$. The receiving frequency is $f_{RX}$, and there is a blocking signal at frequency $f_{BLK}=2*f_{TX}-f_{RX}$.

The third-order intermodulation products of frequencies $f_{TX}$ and $f_{BLK}$ include $2*f_{TX}-f_{BLK}$, which results in a spurious signal 404 at the frequency $f_{RX}$, having a bandwidth equal to twice the bandwidth 402 of the transmission signal. Thus, the third-order intermodulation product frequency folds onto the $f_{RX}$ frequency and causes interference. The receiver has difficulty distinguishing the received signal from the spurious signal interference.

The digital signals at the output of the ADCs 146 and 148 will, in general, be contaminated by thermal noise (Nt), distortions caused by receiver impairments (Dr), and distortion caused by a strong transmitter signal (Dt) leaking and coupling back into the received channel of interest. The distortion Dt can occur due to, for example, second and third-order non-linearities of receiver components (e.g., the LNA 136, mixers 138 and 140), which may cause strong intermodulation between a strong blocking signal and a strong transmitter leakage. The distortion Dt can also occur due to the Tx-LO coupling to the Rx mixers 138 and 140, or a harmonic of a transceiver clock occurring at the transmit frequency that is coupled to Rx-LO.

The distortion Dt represents the total distortion due to any of the above-mentioned effects. The illustrated examples remove Dt by using the digital transmit signal generated directly by the digital baseband processor 102. The digital transmit signal is a clean signal, and has no distortion. The power transmitted by the transceiver is known, and the example methods may be applied if the transmitted power is greater than a pre-determined minimum power, which is the minimum power for the transmitter to cause an appreciable distortion Dt in the receiver.

Returning to FIG. 1, in typical full-duplex transceivers, the digital signals are sent from the decimation filter 150 to the digital baseband processor 102 for data processing. However, typical full-duplex filters often have unacceptable levels of transmitter leakage present in the digital signals, causing data errors and reduced data throughput. Previous solutions to reduce transmitter leakage include implementing a surface acoustic wave (SAW) filter as a bandpass filter. SAW filters are typically too large to fit on an IC, and therefore additional circuit board area must be dedicated to an external SAW filter. Such solutions become impractical as devices are reduced in size. To cancel the transmitter leakage from the digital signals, the adaptive filter 106 detects the transmitted digital signals from the digital baseband processor 102, filters the signals to substantially match the filtering the signals receive in the transceiver 106, and subtracting the filtered signals from the received digital signals to cancel the transmitter leakage distortion.

To cancel distortion caused by transmitter leakage, the example adaptive filter 106 includes a first and second-order generator 152, an adaptive filter 154, and summers 156 and 158. The example first and second-order generator 152 takes advantage of the form of the distortion caused by transmission leakage. That is, the transmission leakage distortion is a weighted and/or shifted version of the transmission signal or the second power of the transmission signal. Thus, the first and second-order generator 152 receives the transmitted digital signals and generates first power or second power signals based on the transmitted digital signals to provide a reference signal for filtering and further processing of the received signal.

The transmitted digital signals include an in-phase signal and a quadrature signal and, thus, the sum of the signals is a complex digital signal. The complex digital signal is input to the adaptive filter 106, and is represented in FIG. 1 as r(n), where n={0, 1, ...} is a time index. The first and second-order products are represented as $\bar{x}(n)=r(n)^M$, where M=1, 2. Therefore, the first-order product is the input complex signal r(n), and the second-order product is the square of the input complex signal r(n). The example first and second-order generator 152 generates either the first-order product or the second-order product at any given time, because any transmitter leakage is present as only one of a first-order or a second-order product. The following discussion will refer to a second-order product. However, the discussion is equally applicable to a first-order product.

The product $\bar{x}(n)$ is input to the adaptive filter 154, which is represented by the function $\bar{w}(n)$, and where $\bar{x}(n)$ and $\bar{w}(n)$ are vectors. The product of $\bar{w}(n)$ is output as a complex digital signal $y(n)=\bar{x}^T\bar{w}$, where $\bar{x}^T$ is the transpose of $\bar{x}(n)$. The output y(n) is combined with the received digital signal d(n) at the summers 156 and 158 to generate a complex digital data signal e(n). The example adaptive filter 154 has an update function $\bar{w}(n+1)=\bar{w}(n)+\mu\bar{x}^*(n)e(n)$, where $\bar{x}^*(n)$ is the complex conjugate of $\bar{x}(n)$ and $\mu$ is the learning rate of the adaptive filter 154. In the example of FIG. 1, the adaptive filter 154 is implemented using a least-means-squared (LMS) filter. Thus, e(n) is fed back to the adaptive filter 154 to find the LMS of the e(n) signal.

The object of the adaptive filter 154 is to model the signal filtering that occurs in the transceiver 104 with respect to the transmitter leakage to the receiver. Such filtering in the transceiver 104 may occur due to any one or more of the TX interpolation filters 116, the DACs 118 and 120, the frequency mixers 122, 124, 138 and 140, the summer 126, the power amplifier 128, the duplexer 132, the MN amplifier 134, the LNA 136, the VGAs 142 and 144, the ADCs 146 and 148, and/or the RX interpolation filter 150. If $\bar{w}(n)$ models the transmission signal filtering in the transceiver 104, then y(n) is equal to the distortion Dt present in the received signal d(n), and e(n) is the received signal without distortion Dt, which is used by the digital baseband processor 102. The signal e(n) is further fed back into the adaptive filter 154 to update the weights $\bar{w}(n)$, which are then used to model the distortion for the next digital code r(n).

Although the examples described herein use an LMS filter, the examples may be modified to utilize any type of adaptive filter. Additional adaptive filter types that may be used include normalized LMS (NLMS), recursive least squares (RLS), and frequency domain methods.

Figure 5:
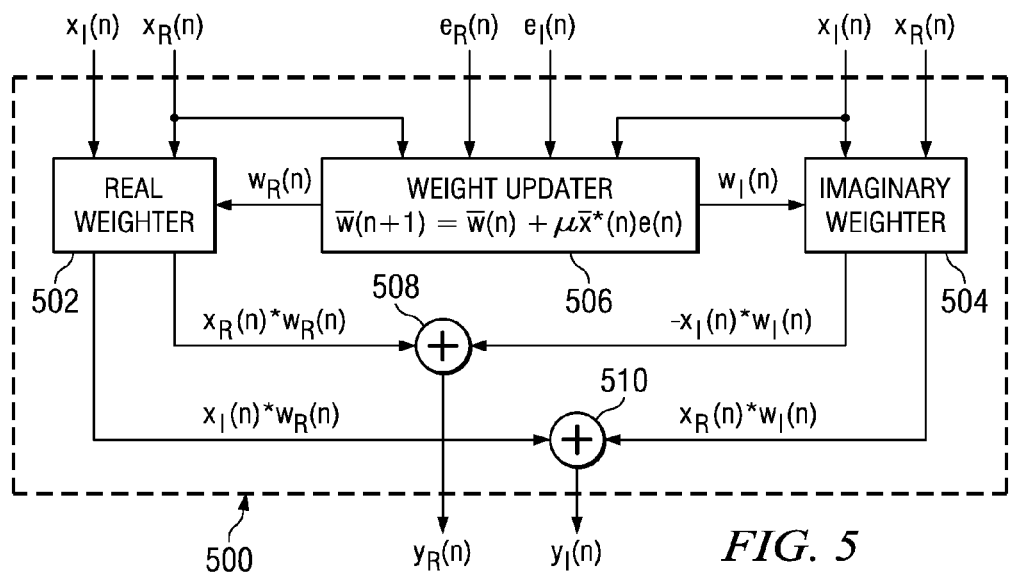
FIG. 5 is a block diagram illustrating an example single-coefficient least-means-squared filter to implement the adaptive filter of FIG. 1.

FIG. 5 is a block diagram illustrating an example single-coefficient LMS filter 500 to implement the adaptive filter 154 of FIG. 1. The LMS filter 500 applies a set of complex weights $\bar{w}(n)$ to a complex digital signal $\bar{x}(n)$ to output a second complex digital signal y(n). The output digital signals y(n) are subtracted from a distorted digital signal to generate an error signal e(n) as shown in FIG. 1. The error signal e(n) is fed back to the LMS filter 500 to update the weights $\bar{w}(n)$, and the weights $\bar{w}(n)$ are determined based on the method of steepest descent, or in the direction of the reverse gradient at each digital signal sampling.

The example LMS filter 500 includes a real weighter ($w_R(n)$) 502 and an imaginary weighter ($w_I(n)$) 504. The real weight 502 and the imaginary weight 504 are updated by a weight updater 506. The real weighter 502 receives the complex digital input $\bar{x}(n)$, including the real part $x_R(n)$ and the imaginary part $x_I(n)$, and weights the complex digital input $\bar{x}(n)$ based on the real part $W_R(n)$ of the LMS weight $\bar{w}(n)$. Similarly, the imaginary weighter 504 receives the complex digital input $\bar{x}(n)$, including the real part $x_R(n)$ and the imaginary part $x_I(n)$, and weights the complex digital input $\bar{x}(n)$ based on the imaginary part $w_I(n)$ of the LMS weight $\bar{w}(n)$. In the example of FIG. 5, the LMS filter 500 is a single-coefficient filter, and therefore the vectors $\bar{x}(n)$ and $\bar{w}(n)$ are scalar quantities. In a multiple-coefficient filter, $\bar{x}(n)$ and $\bar{w}(n)$ represent vectors. The weight updater 506 receives the complex digital input $\bar{x}(n)$ and the error signal e(n) and updates the complex LMS weight $\bar{w}(n)$ using the formula $\bar{w}(n+1)=\bar{w}(n)+\mu\bar{x}^*(n)e(n)$.

On receiving the weights $\bar{w}(n)$ and the complex digital signals $\bar{x}(n)$, the real weighter 502 and the imaginary weighter 504 generate weighted digital signals, which are combined to generate the complex adaptive product y(n). The adaptive product y(n) approximates the transmitter leakage caused by the transceiver 104 and filtering performed on the transmitter leakage, the result of which causes distortion in the received digital signals d(n). To generate the real part $y_R(n)$, the real weighter 502 generates a term $x_R(n)*w_R(n)$ and the imaginary weighter generates a term—$x_I(n)*w_I(n)$. A summer 508 sums the terms generated by the real weighter 502 and the imaginary weighter 504 to generate $y_R(n)$. In contrast, to generate the imaginary part $y_I(n)$, the real weighter 502 generates a term $x_I(n)*w_R(n)$ and the imaginary weighter 504 generates a term $x_R(n)*w_I(n)$. A summer 510 sums the terms to generate $y_I(n)$. The real and imaginary parts $y_R(n)$ and $y_Q(n)$ are output from the LMS filter 500 to be combined at the example summers 156 and 158 of FIG. 1, respectively.

As mentioned above, $\mu$ is a learning or convergence factor that controls the rate of change of the weights $\bar{w}(n)$. Generally, μ is a constant that may be set based on the average power (i.e., in watts) of the complex digital signals r(n) generated by the digital baseband processor 102. However, μ may also be varied based on varying power of the complex digital signals r(n), where μ is inversely proportional to the power of r(n).

The example LMS filter 500 illustrates a single-coefficient, or single-tap, filter. However, a multi-tap filter is required in many implementations. Multi-tap filters are known and therefore will not be discussed further.

Figure 6:
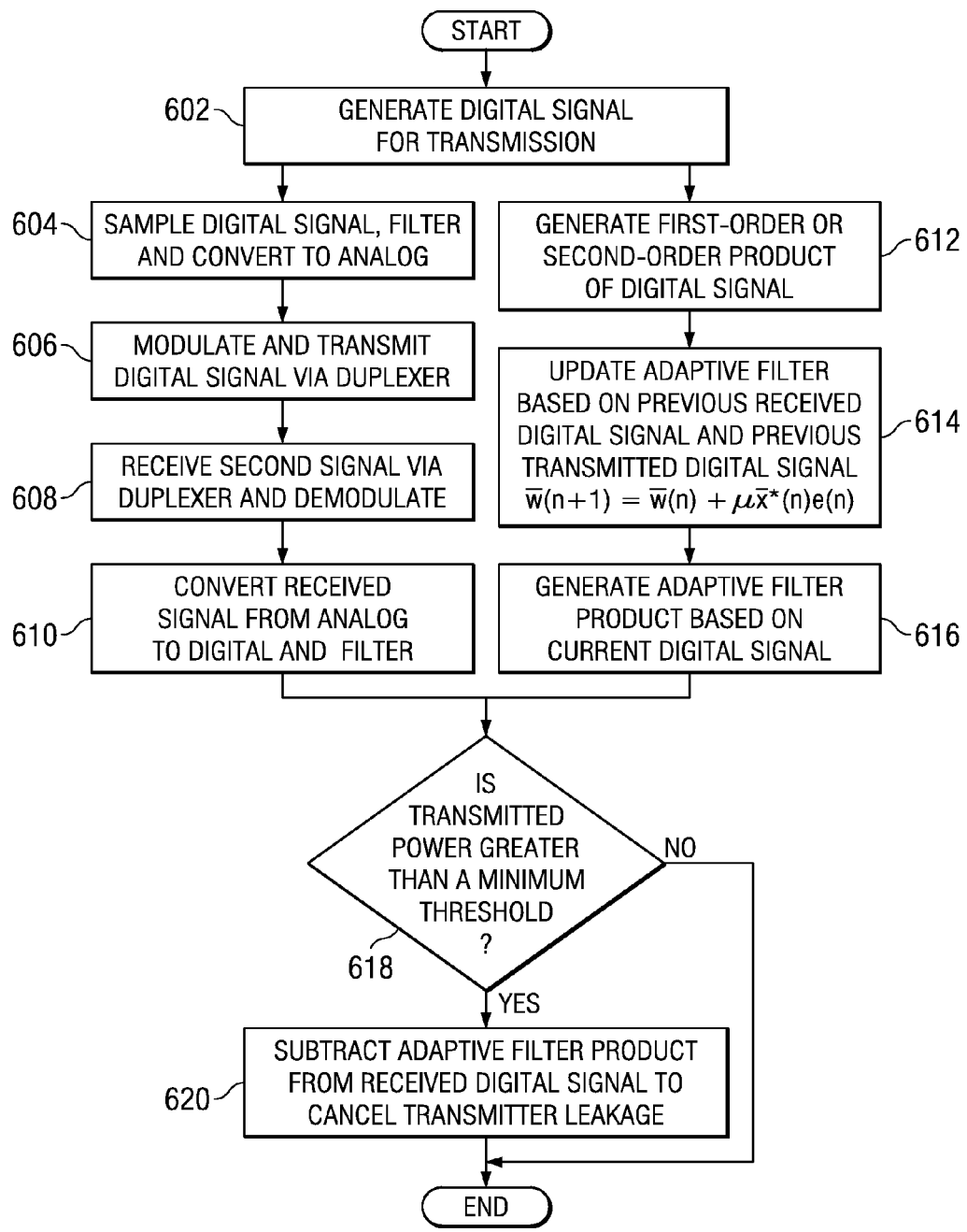
FIG. 6 is a flow diagram illustrating an example method to reduce distortion in a received signal caused by transmitter leakage in a full-duplex transceiver.
Figure 8:
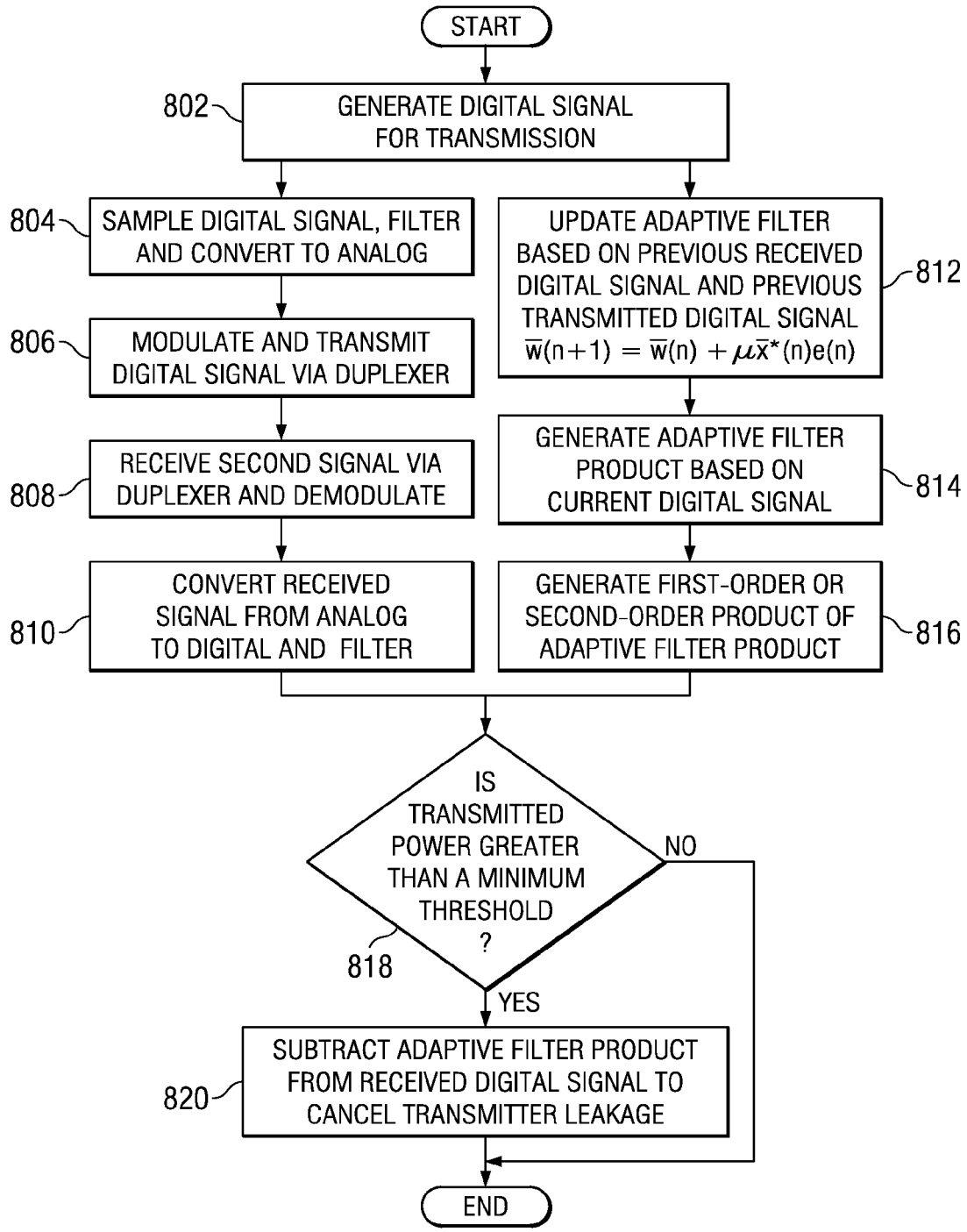
FIG. 8 is a flow diagram illustrating another example method to reduce distortion in a received signal caused by transmitter leakage in a full-duplex transceiver.

The example LMS filter 500 of FIG. 5, the example method 600 of FIG. 6, and/or the example method of FIG. 8 may be implemented as hardware or as computer-executable instructions encoded on a tangible storage medium to be executed by a processing unit (e.g., the example digital baseband processor 102). Example computer-readable media include, for example, a magnetic medium, such as a magnetic disk or tape; a magneto-optical or optical medium such as an optical disk; or a solid state medium such as a memory card or other package that houses one or more read-only (non-volatile) memories, random access memories, or other re-writable (volatile) memories, or successor storage media to any of the above.

FIG. 6 is a flow diagram illustrating an example method 600 to reduce distortion in a received signal caused by transmitter leakage in a full-duplex transceiver. The example method 600 may be performed to implement the example digital baseband processor 102, the example transceiver 104, the example adaptive filter 106, and/or more generally the example communication system 100 of FIG. 1. The example method 600 may be performed to reduce distortion occurring in a communication system transceiver that may be present due to transmitter leakage into a received signal.

The method 600 of FIG. 6 begins as the digital baseband processor 102 of FIG. 1 generates a digital signal for transmission via the transceiver 104 (block 602). The digital signal is a complex digital signal, including an in-phase (i.e., real) component and a quadrature (i.e., imaginary) component. The complex digital signal is sent to the transceiver 104 and is also read by the adaptive filter 106, where each system processes the signal substantially simultaneously. Therefore, the sequence of blocks 604-610 and the sequence of blocks 612-616 may be performed simultaneously, substantially simultaneously, or in any sequence such that the results of blocks 610 and 616 may be utilized simultaneously or substantially simultaneously.

The transceiver 104 receives the complex digital signal, filters the signal (e.g., via an interpolation filter), and samples the complex digital signal to convert the digital signal to a complex analog signal (block 604). The transceiver 104 then modulates the complex analog signal by mixing the complex analog signal with a local oscillation signal (e.g., Tx-LO) at the transmitter frequency (e.g., $\omega_T$), and transmits the modulated signal via a duplexer (e.g., the duplexer 130 of FIG. 1) (block 606). While transmitting the analog signal, the duplexer 130 receives a second analog signal via the duplexer 130 and demodulates the second analog signal (block 608). The demodulated signal is a complex analog signal. The second complex analog signal may include, for example, data intended for use by the digital baseband processor 102.

The example transceiver 104 demodulates the second analog signal by mixing the signal with a local oscillator (e.g., Rx-LO) at the receiver frequency (e.g., $\omega_R$). However, the second analog signal may include a blocking signal at a frequency $f_{BLK}$. In such a case, the blocking frequencies $f_{BLK}$, in the presence of strong transmitter leakage from the first analog signal, may cause intermodulation distortion at the receive components, including antenna 130, the MN 134, the LNA 136, and/or the mixers 138 and 140, due to non-linear responses in the components. The demodulated analog signal, including any distortion, is converted to a complex digital signal by ADCs 146 and 148, and filtered by a decimation filter (block 610).

While the transceiver 104 transmits and receives signals (blocks 604-610), the adaptive filter 106 reads the digital signal r(n) generated by the digital baseband processor 102 (ignoring for a moment the PSFs 112 and 114) and generates an adaptive filter product (e.g., y(n)) to reduce the distortion in the digital signal output by the transceiver 104 to the digital baseband processor 102. On reading the digital signal r(n) generated by the digital baseband processor 102 for transmission, the first and second-order generator 152 of FIG. 1 generates the first-order or second-order product (e.g., $\bar{x}(n)$) of the digital signal (block 612). Whether the first and second-order generator 152 generates a first-order product or a second-order product $\bar{x}(n)$ is based on the particular blocker frequencies $f_{BLK}$ received at the duplexer 130. The following discussion of blocks 614-620 will refer to an example second-order product $\bar{x}(n)$. However, the discussion is equally applicable to a first-order product.

When the first and second-order generator 152 generates the second order product (block 612), the adaptive filter (e.g., the adaptive filter 154 of FIG. 1) updates the filter weights $\bar{w}(n)$ based on the second-order product 152 (i.e., $\bar{x}(n)$ of FIG. 1) and the most-recently corrected received digital signal (i.e., e(n)) according to the following adaptive filter formula: $\bar{w}(n+1) = \bar{w}(n) + \mu \bar{x}^*(n)e(n)$ (block 614). Based on the updated adaptive filter weights $\bar{w}(n)$ and the second-order product $\bar{x}(n)$, the adaptive filter 154 generates an adaptive filter product y(n) (block 616). The adaptive filter product y(n) should approximate the transmission leakage following the filtering the leakage received in the transceiver 104. The digital baseband processor 102 or the transceiver 104 then determines whether the power of the transmitted signals is greater than a minimum threshold (block 618). If the power is below the minimum, the transmitted signals generally do not cause an appreciable distortion in the received signals, and the example method 600 may end. However, if the power is greater than the threshold (block 618), summers subtract the adaptive filter product y(n) (which is complex) from the received complex digital signal d(n) to produce a new complex digital signal e(n) having reduced distortion (block 620). The new complex digital signal e(n) may then be processed by the digital baseband processor 102 with higher data reliability.

Figure 7:
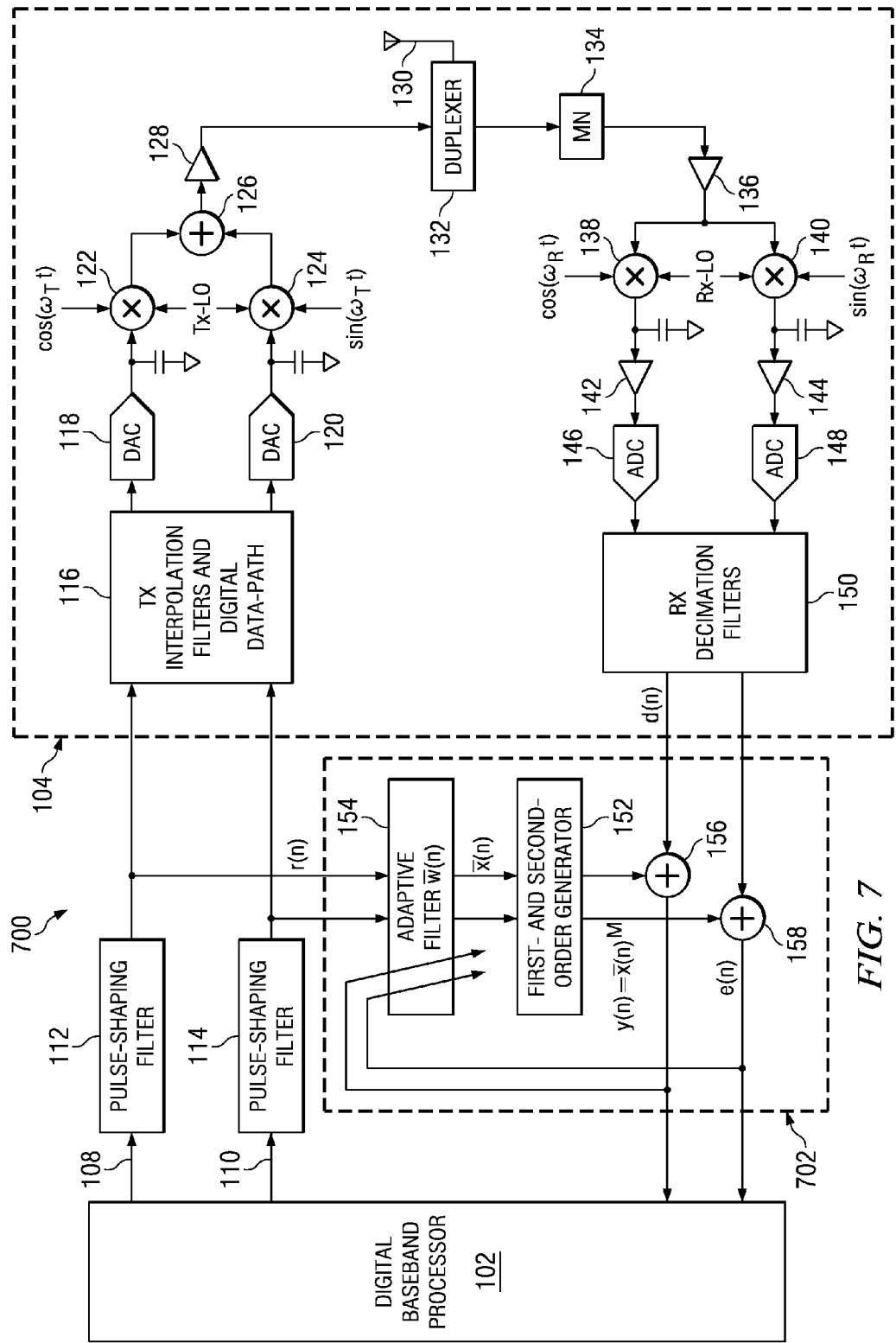
FIG. 7 is a block diagram illustrating another example full-duplex communication system configured to cancel distortion in a received signal from transmitter leakage.

FIG. 7 is a block diagram illustrating another example full-duplex communication system 700 configured to cancel distortion in a received signal from transmitter leakage. The example system 700 includes the digital baseband processor 102 and the transceiver 104 of FIG. 1, further including the same components 116-150 of the transceiver 104. The system 700 further includes an adaptive filter 702.

The example adaptive filter 702 of FIG. 7 includes the example first and second-order generator 152, the example adaptive filter 154, and the example summers 156 and 158 of FIG. 1. However, the first and second-order generator 152 and the adaptive filter 154 are configured so that the adaptive filter 154 operates on the complex digital signals r(n) generated by the digital baseband processor 102, and the first and second-order generator 152 generates the first or second-order product y(n) of the LMS filter product $\bar{x}(n)$. The first or second-order product y(n) is then subtracted from the complex digital signal d(n) received from the transceiver 104 at summers 156 and 158 to generate a complex digital signal e(n) with reduced distortion. The complex digital signal e(n) is fed back to the LMS filter to update the weights $\overline{w}(n)$, and is processed by the digital baseband processor 102. As a result, the adaptive filter 702 reduces distortion caused by transmitter leakage.

FIG. 8 is a flow diagram illustrating another example method 800 to reduce distortion in a received signal caused by transmitter leakage in a full-duplex transceiver. The example method 800 may be performed to implement the example digital baseband processor 102, the example transceiver 104, the example adaptive filter 702, and/or more generally the example communication system 700 of FIG. 7. The example method 800 may be performed to reduce distortion in a communication system transceiver that may be present due to transmitter leakage in to a receiver.

The method 800 of FIG. 8 begins as the digital baseband processor 102 of FIG. 7 generates a digital signal (e.g., r(n)) for transmission via the transceiver 104 (block 802). The digital signal is a complex digital signal, including an in-phase (i.e., real) component and a quadrature (i.e., imaginary) component. The complex digital signal is sent to the transceiver 104 and is also read by the adaptive filter 702, where each system processes the signal substantially simultaneously. Therefore, the sequence of blocks 804-810 and the sequence of blocks 812-816 may be performed simultaneously, substantially simultaneously, or in any sequence such that the results blocks 810 and 816 may be utilized simultaneously or substantially simultaneously. Blocks 804-810 may be executed in substantially the same way and the same order as blocks 704-710 of FIG. 7 and, thus, will not be discussed further. After execution of block 810, the transceiver 104 outputs a complex digital signal (e.g., d(n)) that includes distortion caused by transmitter leakage.

While the transceiver 104 transmits and receives signals (blocks 804-810), the adaptive filter 802 reads the digital signal r(n) generated by the digital baseband processor 102 (ignoring the PSFs 112 and 114) and generates an adaptive filter product (e.g., $\overline{x}(n)$) to reduce the distortion in the digital signal output by the transceiver 104 to the digital baseband processor 102. On reading the digital signal r(n) generated by the digital baseband processor 102 for transmission, the adaptive filter 154 of FIG. 7 updates the filter weights $\overline{w}(n)$ based on the digital code and the most-recently corrected received digital signal e(n) according to the adaptive filter formula: $\overline{w}(n+1)=\overline{w}(n)+\mu \overline{x}^*(n)e(n)$ (block 812). The adaptive filter 154 then generates an adaptive filter product $\overline{x}(n)$ based on the updated filter weights $\overline{w}(n)$ and the digital code r(n) (block 814).

Based on the adaptive filter product $\overline{x}(n)$, the first and second-order generator 152 of FIG. 7 generates a first-order or second-order product (e.g., y(n)) of the complex adaptive filter product (block 816). Whether the first and second-order generator 152 generates a first-order product or a second-order product y(n) is based on blocker frequencies $f_{BLK}$ received at the duplexer 130. The first or second-order product y(n) should approximate the transmission leakage following the filtering the leakage received in the transceiver 104. The discussion of this example will refer to a second-order product y(n). However, the described examples are equally applicable to a first-order product. The digital baseband processor 102 or the transceiver 104 then determines whether the power of the transmitted signals is greater than a minimum threshold (block 818). If the power is below the minimum, the transmitted signals generally do not cause an appreciable distortion in the received signals, and the example method 800 may end. However, if the power is greater than the threshold (block 818), summers (e.g., the summers 156 and 158 of FIG. 7) subtract the second-order product y(n) (which is complex) from the received complex digital signal d(n) to produce a complex digital signal (e.g., e(n)) having reduced distortion (block 820). The new complex digital signal may then be processed by the digital baseband processor 102 with higher data reliability.

Although certain example methods and apparatus are described herein, other implementations are possible. The scope of coverage of this patent is not limited to the specific examples described herein. On the contrary, this patent covers all methods and apparatus falling within the scope of the invention.

What is claimed is:

1. A communication system to reduce distortion in a full-duplex transceiver, comprising:
   a full-duplex transceiver configured to generate a first analog signal based on a first digital signal for transmission over a full-duplex channel, receive a second analog signal via the full-duplex channel, generate a second digital signal based on the second analog signal, wherein the second digital signal includes coupling distortion based on the first analog signal; and
   an adaptive filter configured to generate an adaptive filter signal based on the first digital signal, and to reduce the coupling distortion from the second digital signal by subtracting the adaptive filter signal from the second digital signal;
   wherein the adaptive filter reduces distortion by generating a third digital signal by subtracting the adaptive filter signal from the second digital signal.

2. A communication system as defined in claim 1, further comprising a processor configured to do at least one of generate the first digital signal or implement the adaptive filter.

3. A communication system as defined in claim 2, further comprising a computer-readable medium storing instructions thereon for execution by the processor to implement the adaptive filter.

4. A communication system as defined in claim 1, wherein the adaptive filter is configured to reduce the coupling distortion when a transmit power of the first digital signal is greater than a minimum power threshold.

5. A communication system as defined in claim 1, further comprising at least one of a first-order generator configured to generate a first-order product or a second-order generator configured to generate a second-order product based on the first digital signal.

6. A communication system as defined in claim 1, wherein the adaptive filter comprises filter weights and a filter weight updater configured to modify the filter weights based on the third digital signal.

7. A communication system as defined in claim 6, wherein the filter weight updater is configured to modify the filter weights based on the first digital signal.

8. A communication system as defined in claim 1, wherein the adaptive filter comprises a least-mean-squared filter.

9. A method to reduce distortion in a full-duplex transceiver, comprising:
   generating a first digital signal;
   generating a first analog signal based on the first digital signal for transmission over a full-duplex channel;
   receiving a second analog signal via the full-duplex channel;
   generating a second digital signal based on the second analog signal, wherein the second digital signal includes coupling distortion based on the first analog signal;
   generating an adaptive filter signal based on the first digital signal; and reducing the coupling distortion from the second digital signal by subtracting the adaptive filter signal from the second digital signal;

wherein reducing the coupling distortion comprises generating a third digital signal by subtracting the adaptive filter signal from the second digital signal.

10. A method as defined in claim 9, further comprising generating at least one of a first-order product or a second-order product of the first digital signal.

11. A method as defined in claim 10, wherein the adaptive filter signal is based on the first-order product or the second-order product of the first digital signal.

12. A method as defined in claim 9, wherein generating the adaptive filter signal comprises applying filter weights to the first digital signal.

13. A method as defined in claim 12, further comprising generating at least one of a first-order product of the adaptive filter signal or a second-order product of the adaptive filter signal.

14. A method as defined in claim 9, wherein reducing the coupling distortion is performed when a transmit power of the first digital signal is greater than a minimum power threshold.

15. A method as defined in claim 9, further comprising modifying an adaptive filter based on the third digital signal prior to generating the adaptive filter signal.

16. A method as defined in claim 15, wherein modifying the adaptive filter is based on the first digital signal.

17. A method as defined in claim 15, wherein modifying the adaptive filter is based on a first-order product of the first digital signal or a second-order product of the first digital signal.

18. An adaptive filter to reduce distortion in a full-duplex transceiver, comprising:

a full-duplex transceiver, configured to:
receive a first digital baseband signal and generate a first analog signal based on the first digital baseband signal;
transmit the first analog signal over a full-duplex channel via a duplexer and an antenna;
receive a second analog signal on the antenna via the duplexer, wherein the second analog signal includes coupling distortion based on the first analog signal;
output a second digital baseband signal based on the second analog signal, wherein the second digital baseband signal includes a digital representation of the coupling distortion; and an adaptive filter, configured to:
generate a first-order intermodulation distortion product or a second-order intermodulation distortion product based on the first digital baseband signal;
update a least-means-squared filter based on a third digital baseband signal and one of the first-order intermodulation product or the second-order intermodulation product, wherein the third digital baseband signal is received before the second digital baseband signal;
generating an adaptive filter product based on the first digital baseband signal and the least-means-squared filter; and
reducing the coupling distortion in the second digital baseband signal by subtracting the adaptive filter product from the second digital baseband signal.

* * * * *